ized from one another by impermeable barrier means. # United States Patent

Strumbos

[15] 3,644,158
[45] Feb. 22, 1972

[54] METHOD FOR CONSTRUCTING A HONEYCOMB CORE STRUCTURE

[72] Inventor: William P. Strumbos, 85 Middleville Road, Northport, N.Y. 11768

[22] Filed: Jan. 9, 1970

[21] Appl. No.: 1,698

[52] U.S. Cl. .......................................... 156/197, 156/79
[51] Int. Cl. .......................................................... B31d 3/02
[58] Field of Search ............... 156/197, 77, 78, 83, 156, 287, 156/305, 79; 260/2.5 AX; 52/2; 161/43; 264/45, 47, 51, 55

[56] References Cited

UNITED STATES PATENTS

| | | | |
|---|---|---|---|
| 2,947,041 | 8/1960 | Imbrecht | 52/2 |
| 3,170,471 | 2/1965 | Schnitzer | 52/2 |
| 3,455,848 | 7/1969 | Yoncoskie et al. | 260/2.5 A X |

*Primary Examiner*—Benjamin A. Borchelt
*Assistant Examiner*—G. E. Montone

[57] ABSTRACT

In the art of constructing honeycomb core structures, a method for treating the honeycomb core material during the manufacturing process with a self-contained force-generating substance such that it can be shipped in the unexpanded condition and can be expanded when required by activating the substance. The force-generating substance is a stable, but potentially reactive, foamable material coated on the walls of the unexpanded core cells with the reactants of the material isolated from one another by impermeable barrier means. These barrier means are ruptured or dissolved by suitable means to trigger the foaming reaction that provides the forces to expand the core. Because the foamable means for expanding the core are self-contained, and can be remotely activated, honeycomb core structures can be produced having a foamed-in-place core in which, also, the expansion of the core locks the components of the structure together such that the need for other fastening means is thereby eliminated.

10 Claims, 20 Drawing Figures

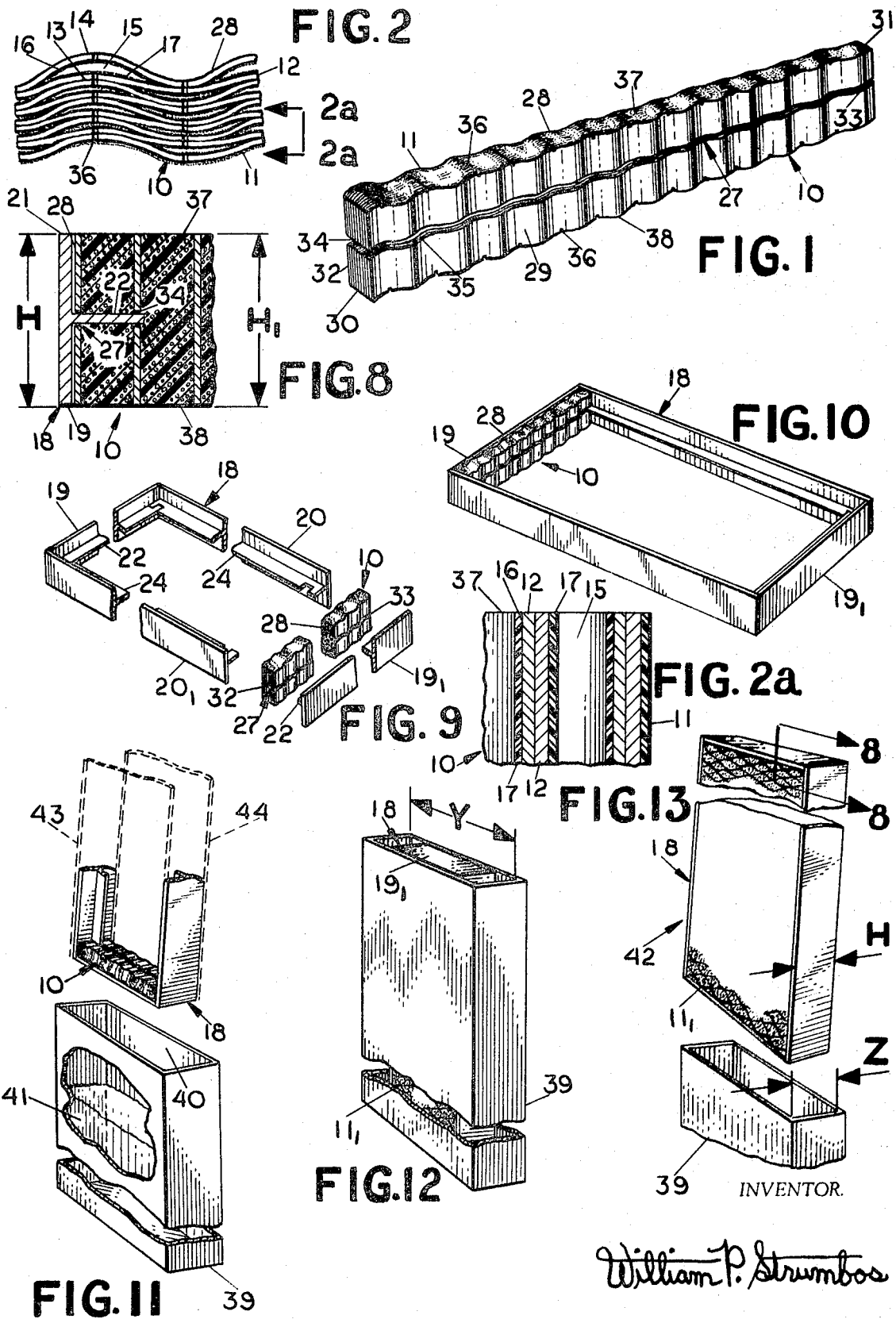

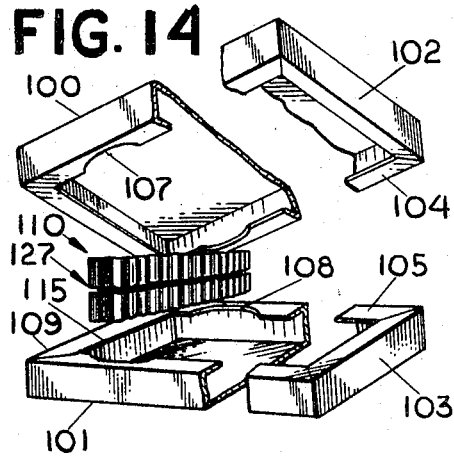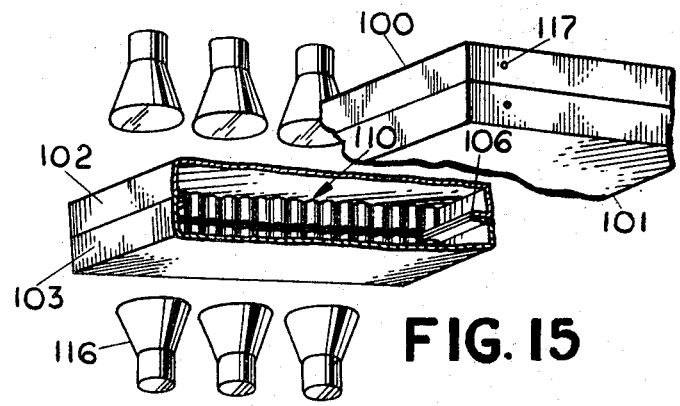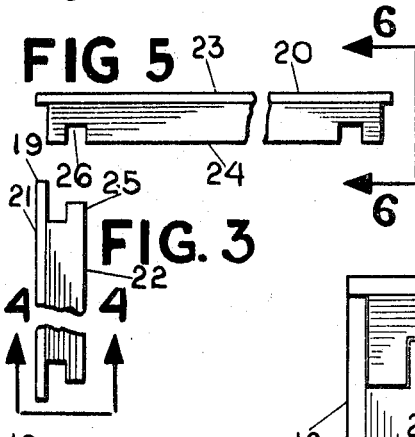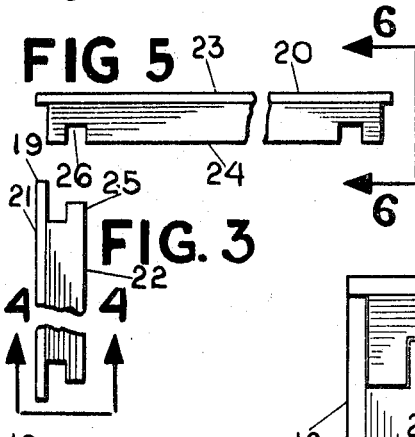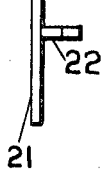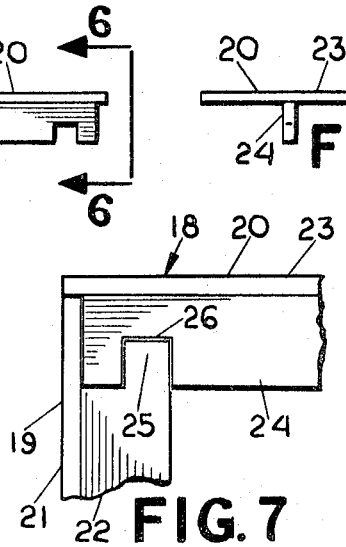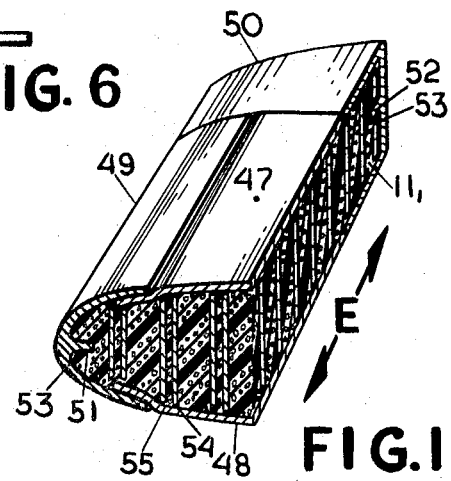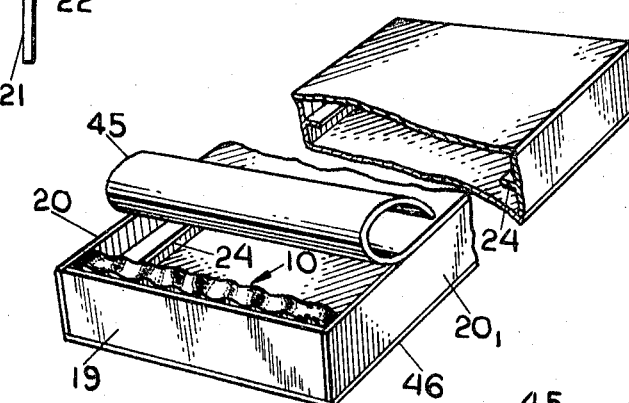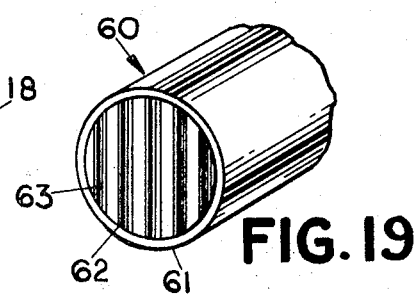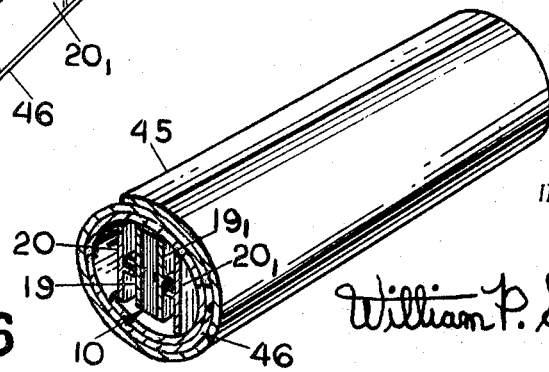

METHOD FOR CONSTRUCTING A HONEYCOMB CORE STRUCTURE

BACKGROUND OF THE INVENTION

This invention relates to a method for constructing honeycomb core structures and, particularly, to a method in which self-contained chemical means are used to expand the honeycomb core used therein.

It is common practice to manufacture honeycomb by the so-called "expansion" process. Generally speaking, this prior art process involves the grouping of a plurality of strips or ribbons of sheet material in a face-to-face relationship and bonding adjacent strips to one another at spaced node points. The node points joining each strip to its adjacent strips are located in some predetermined relationship which will permit the pack to be expanded into a cellular honeycomb structure having geometric cell openings. The honeycomb product of this known prior art process is produced in the unexpanded condition commonly referred to as a "pack" and the pack is expanded subsequently when it is prepared for use. In the prior art, the expansion of the pack is done either by mechanical means as by the application of a pulling force on the end strips or webs on opposite sides of the pack, or a fluid under pressure is injected into the cells to thereby expand the core. The requirement for machines for expanding the pack mechanically and for equipment and a supply of pressurized fluid for the fluid expansion means are obvious limitations of these prior art methods.

Honeycomb core is used in the expanded condition and generally this use is in a sandwich-type structure employing face sheets and side members or a frame in conjunction with the honeycomb core. To add strength and insulation to the structure, the core is often filled with a foamed plastic. This plastic is generally foamed into the core before both of the face sheets are installed or the foam ingredients are applied such that the foaming occurs after the face sheets are installed. It is to be noted that in both these prior art procedures the core is in the expanded condition prior to the foaming phase of the operation. Conventionally, therefore, in order to obtain a honeycomb core structure having the core filled with a foamed plastic for strength and insulation, it is first necessary to have a supply of expanded honeycomb with the disadvantages entailed in the shipping and other handling of honeycomb in that condition or it is necessary to provide facilities on the site for expanding the honeycomb with the cost and inconvenience as well as the difficulty in quality control implied by such necessity. And, secondly, if a foam-filled core is to be used, the equipment for foaming in place the foamable material or in preparing the ingredients if the foamable material is to be applied in the unfoamed state prior to the assembly of the structure likewise presents disadvantages with respect to cost, convenience, and quality control.

SUMMARY OF THE INVENTION

Therefore, to overcome the foregoing and other difficulties of the prior art, the general object of this invention is to provide a method in which honeycomb is treated during its fabrication with a stable, but potentially reactive, self-contained force generating substance such that it can be shipped and otherwise handled in the convenient unexpanded pack condition and in which the substance can be activated by minimal means such as, for instance, heat to expand the honeycomb for use. It is a further object that the self-contained force-generating substance, after it has expanded the honeycomb, remains in place in the cells to strengthen and insulate the structure.

It is another object of this invention to provide honeycomb core structures and a method for fabricating such structures utilizing unexpanded honeycomb which employs a foamable material as a self-contained expansion means so that structures having foamed-in-place cores may be produced conveniently and economically. Furthermore, the structure and core are designed such that the expansion of the core locks the components of the assembly together and eliminates the requirement for other fastening means.

It is also an object of this invention to provide a method for fabricating structures having foamed-in-place cores which eliminates the need on the construction site of complex special metering and pumping equipment usually required to mix and blend the foam-producing ingredients, thus permitting the formation of foam-filled cores in environments where such special equipment is impractical to use.

Other objects and advantages, and a more complete understanding of the invention, will become apparent from the following description and claims, taken in conjunction with the accompanying drawings.

DESCRIPTION OF THE DRAWINGS

For the purpose of illustrating the invention, there is shown in the drawings the forms which are presently preferred, it being understood, however, that this invention is not necessarily limited to the precise arrangements and instrumentalities here shown.

FIG. 1 is a perspective view of an unexpanded pack of honeycomb used in the method of the invention;

FIG. 2 is a fragmentary plan view of the honeycomb of FIG. 1 slightly expanded to show modifications in accordance with the invention;

FIG. 2a is a fragmentary sectional view rotated 90° of the honeycomb of FIG. 2 taken along line 2a—2a;

FIG. 3 is a plan view of a frame member used in the construction of a honeycomb core structure in accordance with the invention;

FIG. 4 is an end view of the frame member of FIG. 3;

FIG. 5 is a plan view of a frame member used with the frame member of FIG. 3;

FIG. 6 is an end view of the frame member of FIG. 5;

FIG. 7 is a fragmentary plan view illustrating a corner of the assembled frame members of FIGS. 3 and 5;

FIG. 8 is a fragmentary sectional view of expanded honeycomb core structure embodied in the invention taken along line 8—8 of FIG. 13;

FIGS. 9, 10, 11, 12, and 13 are perspective views of structure and apparatus embodied in the invention illustrating progressive steps in the method of the invention;

FIG. 14 is an exploded view in perspective of a further modification of honeycomb core structure embodied in the invention;

FIG. 15 is a perspective view partially cutaway of the structure of FIG. 14 illustrating a step in the method of the invention;

FIG. 16 is a perspective view of a further modification of honeycomb core structure embodied in the invention;

FIG. 17 is a perspective view partially cutaway of the structure of FIG. 16 illustrating a step in the method of the invention;

FIG. 18 is a fragmentary sectional view in perspective of a further modification of honeycomb core structure embodied in the invention; and FIG. 19 is a fragmentary perspective view of a further modification of honeycomb core structure embodied in the invention.

DESCRIPTION OF THE PREFERRED EMBODIMENTS

Referring now to the drawings, and more particularly to FIG. 1, there is illustrated a pack 10 of unexpanded honeycomb 11. Honeycomb 11 comprises a plurality of strips or ribbons 12 (see FIG. 2) of sheet material which, as is well known, may be paper, fiber glass fabric, metal foil, plastic, or any other suitable material or combination thereof. Honeycomb 11 is preferably of a "non-pursing" type such as disclosed in U.S. Pat. No. 3,227,599, (K. M. Holland) or its equivalent. As is known, commonly used honeycomb has an inherent tendency to pursably narrow in the direction of the honeycomb strips as the pack is expanded into open cellular form. Nonpursing honeycomb such as disclosed in said prior Holland patent eliminates this narrowing problem because of its capability of expanding evenly while maintaining a constant strip dimension or width and thus is preferred in the method of my invention. Strips 12 of the honeycomb 11 are bonded or welded 13 to one another at spaced node points 14. The node points joining each strip to its adjacent strips are located in some predetermined relationship to permit the pack to be expanded into a cellular honeycomb structure having geometric cell openings 15 (shown in the partially expanded condition in FIG. 2). The walls 16 of each cell 15 are coated with a foamable material 17 as perhaps best shown in FIG. 2a.

Foamable material 17 can be chosen from a wide selection of known materials which are suitable for use with this method. Because of their widespread use and availability, phenolic and urethane foams are particularly suitable. However, because the foamable material is applied during the process of fabricating the honeycomb and the foaming action will not be initiated until some subsequent time, the reactive constituents of the material must be kept isolated from one another until such time as it is desired to activate the foamings action. As is well known in the art, isolation of the reactive components of the foamable material can be by means of an impermeable barrier which is ruptured by known means to initiate the foaming action. In this method, it is preferred to isolate the reactive components from one another by microencapsulation techniques. Such techniques are well known and, if polyurethane foams are to be used, the teachings of U.S. Pat. No. 3,455,848, (R. A. Yoncoskie et al.) are particularly suitable for use in the method of this invention. Microencapsulation techniques provide a stable, but potentially reactive, substantially homogeneous, self-contained mixture of physically separated reactive polyurethane foam-producing ingredients activated at will by means such as applied heat. As is known in these techniques, the required foam-producing ingredients are intimately mixed together as substantially discrete minute particles. Included are either solids or droplets or globules of liquid, termed the internal phase or nuclei, of at least one of the reactive primary polyurethane foam-producing ingredients encapsuled or coated with an inert, impermeable, organic, film-forming, polymeric material (for example, ethyl cellulose) and substantially homogeneously interspersed among the other components. The reactive foam-producing ingredients include the polyol, the polyisocyanate, and the foaming agent. (In some compositions, the polyol or the polyisocyanate has the additional function of acting as the foaming agent.)

If a phenolic is employed as the foamable material, some of the microcapsules can contain phenolic resin, and others can contain both a curing agent or catalyst and a foaming or blowing agent such as, for example, formaldehyde. The type of foamable material used will, of course, depend largely on the use to which the honeycomb structure is to be put and even a foamable concrete or metal can be considered for use. A basic requirement for the material used and its formulation, however, is that the expansion forces generated during the foaming action must be of a magnitude sufficient to expand the core and that the increase in volume upon foaming should be great enough to insure full expansion of the core. Inasmuch as up to 30 p.s.i. and an increase in volume of over 30 times the unfoamed state are produced in typical foaming reactions, these requirements are not felt to be unduly restrictive. Of course, the formulation used will determine the expansion qualities and the pressures produced, for example, in known high-pressure processes, 80,000 p.s.i. polyurethane foaming pressures are experienced.

Moreover, a transitory foamable material that foams to thereby expand the core and then evaporates or sublimates to thus leave the cells of the honeycomb open can be used. The transitory foamable material also can be of the type that can be removed from the cells by being leached or etched out by suitable means after it has served its purpose.

As stated above, the isolation of the reactant ingredients of the foamable material may be effected by an impermeable barrier or membrane. Any suitable material such as wax, natural polymers like gelatin, plastics, or metals can be used for the impermeable barrier. It will be appreciated that the barrier material selected should be chemically inert to the ingredients being isolated and to the environment. As is well known, when it is desired to expose the ingredients to one another to initiate the foaming action, the barrier can be ruptured or penetrated by various means. These means include heat (including that produced by radio frequency heating), pressure, electromagnetic radiation (particularly infra-red and ultraviolet), and suitable fluid solvents. A further technique is to apply the foamable material without the activator on the cell walls during the fabrication of the pack and then to enclose the entire pack in a wrapping of impermeable material. To initiate the foaming action, the impermeable material is stripped away and the pack is exposed to an activator to trigger the foaming action.

In a preferred embodiment of the method of this invention, a frame is provided such that the expansion of the core pack produces a honeycomb panel. The frame 18 comprises two end members 19 and $19_1$ and two side members 20 and $20_1$ which may be of wood, metal, plastic, or any other suitable material. End members 19 and $19_1$ each have a wall portion 21 and a longitudinal rib 22 normal to the wall portion. (See FIGS. 3 and 4.) Side members 20 and $20_1$ each have a wall portion 23 and a longitudinal rib 24 normal to the wall portion. (See FIGS. 5 and 6.) The ribs 22 and 24 of the end and side members are provided with a tongue 25 and a notch 26 respectively in both of their end portions arranged such that the end and side members of the frame 18 can be assembled in an interlocking relationship (FIG. 7). As shown in FIG. 8, the wall portion 21 (and 23) of the frame 18 preferably has a height H substantially similar to the height $H_1$ of the core pack 10 and the pack is provided with a peripheral groove 27 which accommodates the longitudinal rib 22 (and 24) of the frame 18. It will be appreciated that peripheral groove 27 will be cut into the pack to some predetermined depth that takes into consideration the difference in expansion of the core end webs 28 and 29 relative to the core side edges 30 and 31. Inasmuch as it is preferred to utilize a nonpursing type honeycomb core it follows that the core side edges 30 and 31 will not narrow as the pack is expanded. Thus the grooves 32 and 33 cut into the side edges 30 and 31 will have a depth substantially matching originally the width of ribs 22 and 24. However, because of the expansion of cells 15, the grooves 34 and 35 in the end webs of the pack will be cut to a depth which originally is through only a few of the strips 12 associated with end webs 28 and 29 of the core pack.

Should the foamable material used to expand the core pack be of a formulation in which the amount of gas evolved during the foaming process is excessive to the extent that it would likely lead to a deterioration of the quality of the product, means for venting the core pack during the foaming stage must be provided. The vent means can comprise vent holes (not shown) in the walls 16 of the cells 15 of the core 11 as is disclosed, for example, in U.S. Pat. No. 3,249,659, (W. D. Voelker) or preferably can comprise slots 36 sawn or otherwise cut into the upper 37 and/or lower 38 surface of the core pack 10 located such that the walls 16 of each cell 15 is provided with venting means. The size of the vent means will be governed by the amount of gas produced by the foaming action, but a slot 0.025-in. deep and 0.025-in. wide should be suitable for most foamable materials used. If the core is confined closely within structural members during such time as the foaming reaction is taking place, it is obvious, of course, that the structural members should be provided as required with suitable means to carry off the gases from slots 36 or from the other vents provided for the core.

In this embodiment, a nonpursing honeycomb such as the Holland type referenced previously is used. During the process of manufacturing the core pack 10, the ingredients of the foamable material 17 with the activator isolated from the reactants by an impermeable barrier are coated on the areas of the core strips 12 that will (when the core is in the expanded condition) form the walls 16 of the core cells 15. It will be appreciated that the amount of foamable material 17 applied will be governed by the type, formulation, and expansion coefficient of the material used, the desired density of the foam, and other factors well known in the art. By way of example, with polyurethane foam, the coating of foamable chemicals expands to about twenty times the applied thickness. In this embodiment, I prefer to use a microencapsulated polyurethane foam-producing composition such as one of those set forth, for example, in the above referenced Yonkoskie et al. patent and to use a capsule wall material which is dissolved or caused to rupture by exposure to water to thereby release the nucleus material and thus initiate the foaming reaction. The coating of microcapsules 17 is applied to the core strips 12 prior to the step in manufacturing in which the node points 14 of the strips 12 are bonded 13 to one another. Most conveniently, the coating step may be carried out when the glue lines, for instance, are applied. Any known technique such as by spraying, roller applicator, and the like, can be utilized to apply the coating 17. If a binder such as a lacquer, varnish, or resin is employed to insure the integrity of the coating, it is essential that the binder is chemically inert to the honeycomb and associated structure and to the capsules and other ingredients and that it has suitable bonding and drying characteristics. After the honeycomb pack 10 has been fabricated, it is encased in an impermeable strippable plastic film (not shown) to protect it from environmental conditions prior to its being used.

In this embodiment, a tank is provided at the construction site for the solvent used to dissolve the barrier material which separates the activator of the foamable material from the other ingredients. The tank 39 should be deep enough to contain the framed core in its expanded condition and should have an interior width "Y" that will permit convenient access to the core when it is immersed fully in the tank. To confine the foam in the cells, the tank should have an inside dimension "Z" that is only slightly greater than the thickness "H" of the frame and core so as to permit working clearance and, if required, to allow venting of excess gas from the foaming action, but the clearance should not permit an unwanted extrusion of foam from the cells. If required, the inside walls 40 of the tank may be coated with a suitable substance (not shown) to prevent any adhesion of the foam thereto that might impede the free expansion of the core. After tank 39 has been set up and filled to the required level with solvent 41 (in this embodiment, water), the two side members 20 and 20₁ and end member 19 of the frame 18 are assembled by interlocking tongues 25 into notches 26 of ribs 22 and 24 respectively (FIG. 9). The plastic film (not shown) is stripped off core pack 10 and the pack is then slipped into frame 18 by engaging pack side edge grooves 32 and 33 on ribs 24 of side members 20 and 20₁. The pack 10 is slipped into the frame until end web 28 seats on rib 22 of end member 19 and then the other end member 19₁ is installed (FIG. 10). Keeping the end with the core pack 10 downward, the assembly is lowered into the solvent 41 in tank 39 (FIG. 11) with the rate of immersion being governed by the foaming rate of the foamable material previously applied on the walls of the cells of the honeycomb. Care should be exercised, if required, to insure the foaming action is vented properly. When the foaming action has been completed (FIG. 12), ribs 22 and 24 of the frame 18 will be seated securely in peripheral groove 27 of the expanded honeycomb 11₁, firmly locking the core in the frame (FIG. 13) to thus produce a honeycomb panel 42.

It will be appreciated that face sheets may be installed on the honeycomb panel 42 at any convenient time in this embodiment of the method. For example, face sheets 43 and 44 (a fragmentary view thereof shown in broken lines in FIG. 11) can be positioned on the edges of the frame members on either side of the frame 18, such that when the assembly is immersed in the solvent tank 39, not only will the foam expand the core but it will also bond the face sheets thereto. Initially, of course, a slight clearance should be maintained between the face sheets and the frame to insure that the solvent has free access to the core. Before full expansion and curing of the foam, however, the face sheets should be aligned such that they are bonded properly in place by the foam. Foamed polyurethane is inherently adherent to most common construction materials, but its bonding properties can be improved by the addition of suitable adhesive compounds in a known manner on the inside of the face sheets.

A further embodiment of the method of this invention in which the honeycomb core is used with face members such that the assembly forms a panellike sandwich structure is shown in FIGS. 14 and 15. As shown, the face members 100 and 101 have integral peripheral edges 102 and 103 respectively which are lipped over such that when they are placed over one another with the lipped edges 104 and 105 respectively in contact they form a hollow structure with the lipped edges 104 and 105 forming a rib 106 extending around the hollow interior space. Each of the lipped edges 104 and 105 has a cutaway portion 107 and 108 respectively in each of their longitudinal sides which serve to provide sufficient clearance for a core pack 110 to be inserted into position for assembling the face members 100 and 101 to form a panel. Core pack 110 is identical to core pack 10 described previously and the description relating to that embodiment is equally valid for this. As in the previous embodiment, the core pack 110 has a peripheral groove 127. Groove 127, when the core 110 is expanded, accommodates rib 106 of the assembled face members. However, for expanding the core in this embodiment, I prefer to use a a microencapsulated foamable material that is activated as is well known in the prior art by the application of heat.

To fabricate a honeycomb core panel, face member 101 is placed with its lipped edge 105 upward and core pack 110 is positioned in the cutaway portions 108 of the edge. With lipped edge 105 engaged in groove 127, the pack 110 is pushed toward the end 109 of member 101 until the edge 115 of lipped edge 105 engages in groove 127 of the pack. Then face member 100 is positioned with its cutaway portions 107 over the top of pack 110 and is lowered into contact with face member 101 such that edges 104 and 105 are firmly seated on one another. With the two edges in firm contact, face members 100 and 101 are adjusted until their sides and ends are aligned (FIG. 15). Then, with the face members maintained in close contact by suitable means (not shown), the assembly is heated by suitable means such as by heat lamps 116 to activate the foamable material and thus expand core 110. It may be required in the interests of insuring proper venting of the foaming reaction, to provide vents such as holes 117 or other suitable venting means in either or both face members (it will be appreciated that the core 110 will have its cells vented by suitable means such as the slots 36 shown for core 10 in FIG. 1). As described for the previous embodiment, when the core is expanded fully, the rib 106 formed by lipped edges 104 and 105 is trapped in peripheral groove 127 around the core such that the face members are locked together. This mechanical locking action is supplemented by the adhesive properties of the polyurethane foam such as there also is a chemical bond between the face members and the core. The foam, of course, also serves its normal function as an acoustic and thermal insulator.

It is possible to reduce appreciably the shipping and storage space required for honeycomb core structures if face sheets that can be rolled up are used instead of the rigid face members of the embodiments of FIGS. 14 and 15. In such embodiment utilizing flexible face sheets, the frame 18 and core pack 10 shown in FIGS. 1 through 10 are used. As in the embodiments of FIGS. 14 and 15, for expanding the core, I prefer to use a microencapsulated foamable material that is activated by the application of heat. For shipping or storage, the disassembled frame members 19 and 19₁ and 20 and 20₁ and the core pack 10 are rolled up in the face sheets 45 and 46 (FIG. 16). To fabricate a honeycomb core structure, the components of the roll are separated and the frame 18 and core pack 10 are assembled as shown in FIG. 10. The frame and core assembly is then placed between face sheets 45 and 46 which, if required, have been flattened out for the purpose. Suitable weights such as sand bags (not shown) are placed on top of the upper face sheet 45 to insure the assembly is retained in its proper relative alignment during the foaming phase of the operation. Then the foamable material with which the core 11 has been treated is activated by an appropriate heat source such as the heat lamps shown in FIG. 15. If required, suitable means such as vent holes (not shown) are provided to vent the reaction. As before, the expansion of the foamable material (not shown) as it foams will expand the core to lock it mechanically to the frame. In addition, the foamed material will be forced against every interior surface of the structure such that the inherent adhesive properties of the polyurethane foam bonds the face sheets securely to the core. It is also known, of course, to improve the bonding of the face sheets to the frame and core by coating the inside surfaces of the face sheets with a suitable adhesive compound prior to use. Conveniently, the adhesive compound can be one which is activated by the heat lamps used to activate the foaming reaction or by the heat resulting from that reaction.

Although the honeycomb structures in the previously described embodiments of the invention are shown as having a straight-sided construction, other configurations can be utilized. As shown in FIG. 18, the structure can comprise honeycomb core $11_1$ (shown expanded), face sheets 47 and 48, and arcuate side members 49, and end members 50 (a fragmentary view of only one of each of members 49 and 50 is shown). The side and end members are each provided with a rib 51 and 52 respectively which key into a peripheral groove 53 of expanded core $11_1$ in a manner similar to that described for the other embodiments having a frame 18. As before, ribs 51 and 52 can be designed to interlock in a fashion similar to ribs 22 and 24 of the frame 18. It will be appreciated that core $11_1$ will have a cross-sectional configuration 54 similar to the inner surfaces 55 of the assembled face sheets and side and end members. In order to permit unimpeded expansion in the direction indicated by arrow "E", the core must have a constant cross section in the direction of its expansion, but it can have any of a number of cross-sectional configurations in a plane normal to the direction of expansion. FIG. 19 illustrates a further embodiment in which the "frame" of a honeycomb core structure 60 is a hollow cylinder 61 containing honeycomb core 62 of circular cross section when viewed from the perpendicular to the plane of the end web 63 of the core 62.

Thus, although shown and described in what are believed to be the most practical and preferred embodiments, it is apparent that departures therefrom will suggest themselves to those skilled in the art and may be made without departing from the spirit and scope of the invention. I, therefore, do not wish to restrict myself to the particular details illustrated and described, but desire to avail myself of all modifications that may fall within the scope of the appended claims.

Having thus described my invention, what I claim is:

1. The method of constructing a honeycomb core structure in which a plurality of strips of flat sheet material are arranged in a face-to-face relationship and adjacent strips are bonded to one another at predetermined node points to thereby create a laminated pack of said material which can be expanded into an open honeycomb configuration defining geometric cell openings comprising the steps of;

applying during the fabrication of said laminated pack at least one of the reactable ingredients of a foamable material on said strips in the areas of said strips that will comprise the walls of said cell openings, and exposing said foamable material to an activator to initiate the foaming thereof whereby the forces generated by the foaming action against the walls of the cells serve to expand the pack into its open honeycomb configuration.

2. The method of claim 1 wherein the foamable material used has adhesive properties such that it bonds to the surfaces of structure which it contacts during the expansion of the pack to thereby strengthen said structure.

3. The method of claim 1 wherein the laminated pack fits into a rectangular, open-centered, "T"-sectioned, ribbed structure with the rib of said structure being keyed into at least a portion of a peripheral groove provided around said pack whereby the expansion of said pack causes at least the partial engagement of said rib in said peripheral groove to thereby lock the honeycomb mechanically in said structure.

4. The method of claim 1 wherein the activator is isolated from the reactable ingredients of the foamable material by a physical barrier and wherein the foaming action is initiated by removing at least a part of said barrier.

5. The method of claim 4 wherein the physical barrier is a rupturable material and wherein the foaming action is initiated by rupturing at least a part of said barrier.

6. The method of claim 4 wherein the physical barrier is a strippable material and wherein the foaming action is initiated by stripping away at least a part of said barrier.

7. The method of claim 4 wherein the physical barrier is a soluble material and wherein the foaming action is initiated by dissolving at least a part of said barrier.

8. The method of claim 2 wherein structure comprising at least one wall member is positioned against the laminated pack whereby the foaming action expands the pack and the foamed material bonds said structure to the honeycomb.

9. The method of claim 2 wherein structure comprising at least one wall member is positioned against the laminated pack, said wall member having a lipped-over portion having an area cut away for receiving the laminated pack, said lipped-over portion being keyed into at least a portion of a peripheral groove provided around said pack whereby the expansion of said pack causes at least a partial engagement of said lipped-over portion in said peripheral groove to thereby lock the honeycomb mechanically in said structure.

10. The method of claim 9 wherein the structure comprises at least two wall members having lipped-over portions adjoining one another and having an area cut away for receiving the laminated pack, said lipped-over portions being keyed into at least a portion of a peripheral groove provided around said pack whereby the expansion of said pack causes at least a partial engagement of said lipped-over portions in said peripheral groove to thereby lock the honeycomb mechanically in said structure.

* * * * *